United States Patent
Yun et al.

(10) Patent No.: US 10,551,841 B2
(45) Date of Patent: Feb. 4, 2020

(54) MOVING ROBOT AND METHOD OF CONTROLLING THE SAME

(71) Applicant: LG ELECTRONICS INC., Seoul (KR)

(72) Inventors: Hyungtae Yun, Seoul (KR); Seungjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 15/666,987

(22) Filed: Aug. 2, 2017

(65) Prior Publication Data

US 2018/0039275 A1    Feb. 8, 2018

(30) Foreign Application Priority Data

Aug. 3, 2016 (KR) .......................... 10-2016-0099107

(51) Int. Cl.
*G05D 1/02* (2006.01)
*A47L 9/00* (2006.01)
(Continued)

(52) U.S. Cl.
CPC ............ *G05D 1/0214* (2013.01); *A47L 9/009* (2013.01); *A47L 9/1683* (2013.01); *A47L 9/2826* (2013.01);
(Continued)

(58) Field of Classification Search
CPC .............. A47L 11/4008; A47L 11/4011; A47L 11/4061; A47L 11/4072; A47L 9/009;
(Continued)

(56) References Cited

U.S. PATENT DOCUMENTS 8,655,539 B2    2/2014    Yoo et al.
8,954,191 B2 *  2/2015    Yi .................. G05D 1/0246
                                           318/568.11
(Continued)

FOREIGN PATENT DOCUMENTS

CN        13029898        3/2007
CN        102063123       5/2015
(Continued)

OTHER PUBLICATIONS

Korean Office Action dated Mar. 20, 2018 issued in Korean Application No. 10-2016-0099107.
(Continued)

*Primary Examiner* — Robert T Nguyen
(74) *Attorney, Agent, or Firm* — KED & Associates, LLP

(57) ABSTRACT

A autonomous robot includes a main body, a driving unit to move the main body within an operation region, a battery to supply power to the driving unit, and a controller to control the driving unit in a manner that the main body travels along a wall of the operation region to move to a charging stand when a remaining power level of the battery drops below a reference power level, wherein the controller controls the driving unit in a manner that the main body escape from one region corresponding to a closed curve when a movement path of the main body forms the closed curve while the driving unit performs wall following.

20 Claims, 8 Drawing Sheets

(51) Int. Cl.
*A47L 9/16* (2006.01)
*A47L 9/28* (2006.01)
*A47L 11/40* (2006.01)

(52) U.S. Cl.
CPC ........... *A47L 9/2852* (2013.01); *A47L 9/2857* (2013.01); *A47L 9/2873* (2013.01); *A47L 9/2884* (2013.01); *A47L 9/2894* (2013.01); *A47L 11/4008* (2013.01); *A47L 11/4011* (2013.01); *A47L 11/4061* (2013.01); *A47L 11/4072* (2013.01); *G05D 1/0225* (2013.01); *A47L 2201/022* (2013.01); *A47L 2201/04* (2013.01); *G05D 2201/0203* (2013.01)

(58) Field of Classification Search
CPC .... A47L 9/1683; A47L 9/2805; A47L 9/2826; A47L 9/2852; A47L 9/2857; A47L 9/2873; A47L 9/2884; A47L 9/2894; A47L 2201/022; A47L 2201/04; A47L 2201/06; G05D 1/0212; G05D 1/0214; G05D 1/0225; G05D 2201/0203; G05D 2201/0215; Y02B 40/82
See application file for complete search history.

(56) References Cited

U.S. PATENT DOCUMENTS

| | | | |
|---|---|---|---|
| 8,983,661 B2* | 3/2015 | Cho | A47L 9/2805 700/257 |
| 9,442,177 B2* | 9/2016 | Lin | G01S 5/02 |
| 2005/0171644 A1* | 8/2005 | Tani | A47L 9/009 700/253 |
| 2009/0048727 A1 | 2/2009 | Hong et al. | |
| 2013/0096717 A1* | 4/2013 | Yoon | A47L 11/33 700/245 |
| 2013/0325178 A1 | 12/2013 | Jones et al. | |
| 2014/0121876 A1 | 5/2014 | Chen et al. | |
| 2015/0323934 A1* | 11/2015 | Lin | G01S 5/02 701/26 |
| 2017/0344013 A1* | 11/2017 | Haegermarck | G05D 1/0219 |
| 2018/0217611 A1* | 8/2018 | Kim | A47L 9/28 |

FOREIGN PATENT DOCUMENTS

| | | |
|---|---|---|
| JP | H 05-46246 | 2/1993 |
| KR | 10-2004-0039095 | 5/2004 |
| KR | 10-0575707 | 5/2006 |
| KR | 10-2009-0019565 | 2/2009 |
| KR | 10-2009-0104390 | 10/2009 |
| KR | 10-1362373 | 2/2014 |
| KR | 10-1403954 | 6/2014 |
| KR | 10-1406186 | 6/2014 |
| TW | M 451103 | 4/2013 |
| TW | I 517704 | 1/2016 |

OTHER PUBLICATIONS

PCT International Search Report and Written Opinion dated Nov. 17, 2017 issued in Application No. PCT/KR2017/007855.
Taiwanese Office Action dated Aug. 28, 2018 issued in Application No. 106126133.

* cited by examiner

MOVING ROBOT AND METHOD OF CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0099107, filed on Aug. 3, 2016, the contents of which are incorporated by reference herein in its entirety.

BACKGROUND

1. Field

The present disclosure relates to a moving robot and a method of controlling the same, and more particularly, a moving robot capable of overcoming a trap phenomenon, and a method of controlling the same.

2. Background

In general, robots have been developed for industrial use and taken charge of a part of factory automation. In recent years robot application fields have been further expanded, and medical robots, aerospace robots, and the like have been developed, and household robots that can be used at homes have been also made.

A representative example of the household robot is a robot cleaner, which is a type of electronic device for sucking and cleaning surrounding dust and foreign substances while traveling a predetermined region by itself. The robot cleaner may typically include a rechargeable battery, and include an obstacle sensor capable of avoiding obstacles while traveling to travel and clean by itself. In recent years, research have been actively carried out to utilize the robot cleaner in various fields such as health care, smart home, and remote control by moving away from performing a cleaning operation simply by autonomously traveling a cleaning area.

When the robot cleaner performs the autonomous travel in the cleaning area, the robot cleaner may encounter various obstacles present in the cleaning area. Therefore, a traveling algorithm for avoiding such obstacles while carrying out autonomous travel and cleaning work is needed.

When a remaining power level of a battery included in the robot cleaner drops below a specific power level value while the robot cleaner is performing the autonomous travel in the cleaning area, the robot cleaner requires a traveling algorithm for returning to a charging stand installed at one point within the cleaning area. In particular, if the robot cleaner cannot detect information related to its current position within the cleaning area, the robot cleaner may follow along the wall surface to return to the charging stand. In this way, when the robot cleaner performs wall following, the robot cleaner travels along an outline of the cleaning area formed by a wall surface or an obstacle in a preset direction.

However, while the robot cleaner travels using an algorithm for avoiding an obstacle or performs wall following, it may fail to escape from a predetermined area due to being stuck in an obstacle environment, and may only circle within the predetermined area.

As a technology for solving such a problem, according to Korean Patent No. 10-0575707 (published on May 3, 2006), if a specific area is judged as a trap, the robot cleaner performs wall following to escape from the trap. However, this technology does not address the problem of the robot cleaner entering an obstacle region during wall following. Therefore, the above-described technology cannot solve the problem of the robot cleaner failing to escape from the predetermined area with being stuck in the obstacle environment during wall following, and only circling within the predetermined area.

Specifically, when the robot cleaner carries out wall following, since information related to a wall surface or an obstacle is detected at predetermined periods, the robot cleaner may recognize a plurality of obstacles, which are arranged at narrow intervals, such as a wall surface. Therefore, when the robot cleaner enters an area where a plurality of obstacles exist while performing wall following, the robot cleaner may continuously circle within the area without escaping the area.

For example, when the robot cleaner performing the wall following travels under the furniture having a plurality of legs, the robot cleaner recognizes the legs arranged at relatively narrow intervals as a wall, and infinitely circles under the furniture. In another example, when the robot cleaner performing the wall following recognizes a circular obstacle as a wall, a phenomenon of continuously circulating around the circular obstacle may also occur.

As such, when the robot cleaner is trapped, there is a problem that power of the battery may be fully consumed before the robot cleaner returns to the charging stand. In addition, since the robot cleaner in the trap continuously circulates in a predetermined area, unnecessary power consumption may increase. In addition, when the robot cleaner consumes all the power of the battery before the robot cleaner arrives at the charging stand, a user must directly dock the robot cleaner to the charging stand.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
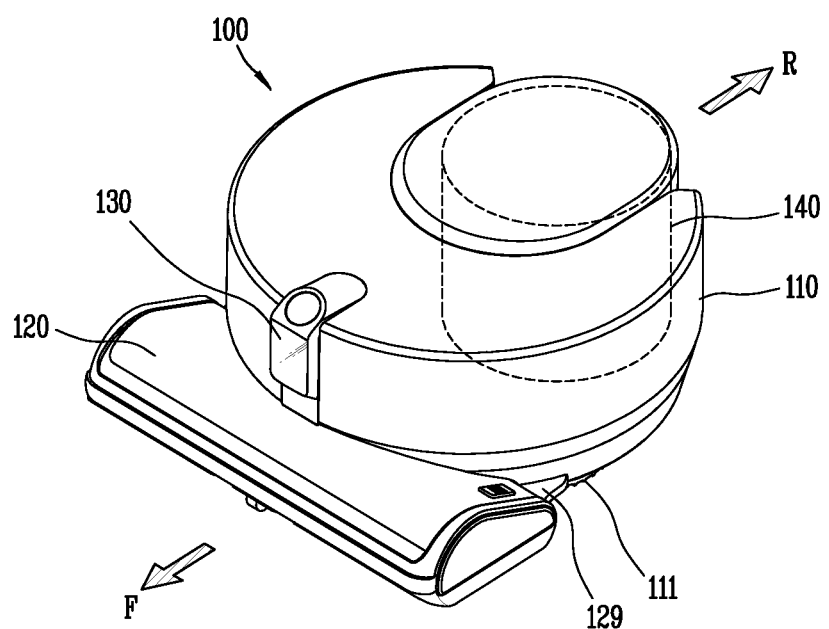
FIG. 1 is a perspective view illustrating one example of a robot cleaner in accordance with the present disclosure.
Figure 2:
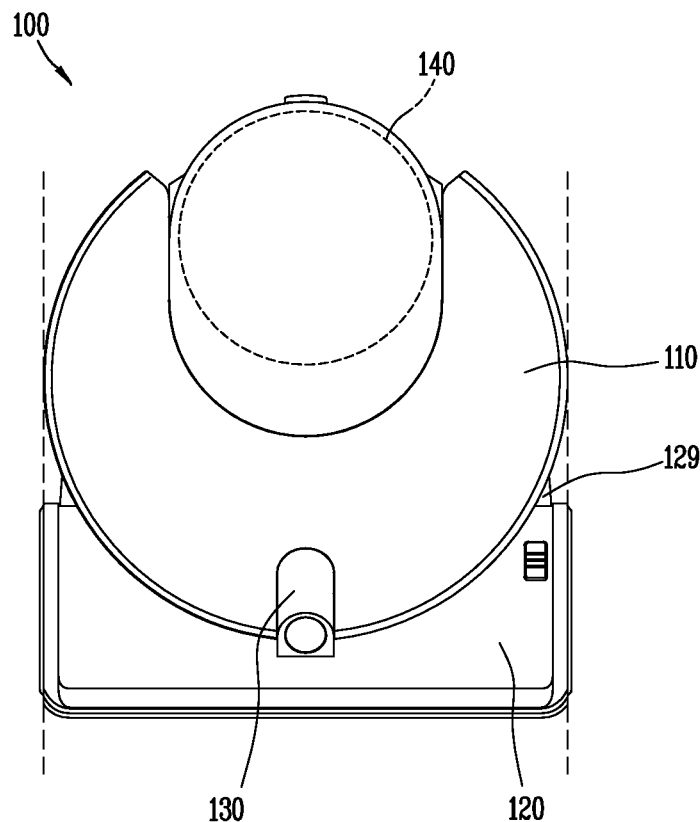
FIG. 2 is a planar view of the robot cleaner illustrated in FIG. 1.
Figure 3:
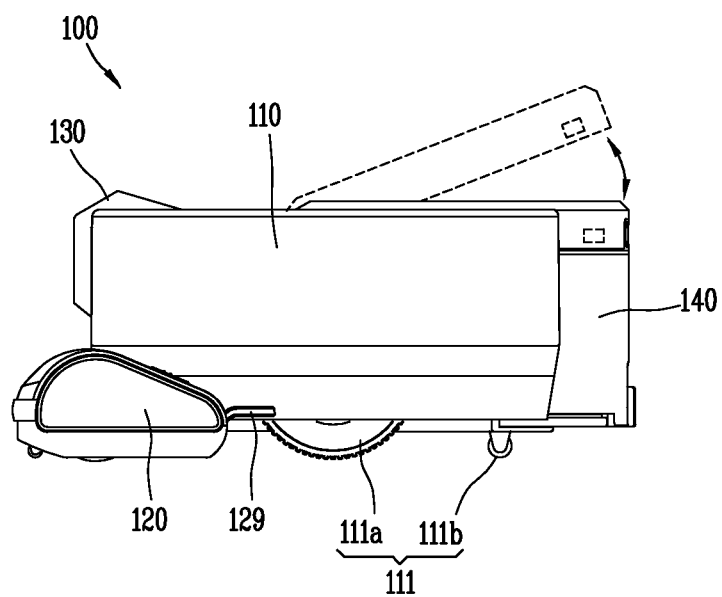
FIG. 3 is a lateral view of the robot cleaner illustrating in FIG. 1.

FIG. 1 is a perspective view illustrating one example of a robot cleaner 100 in accordance with the present disclosure, FIG. 2 is a planar view of the robot cleaner 100 illustrated in FIG. 1, and FIG. 3 is a lateral view of the robot cleaner 100 illustrating in FIG. 1. For reference, in this specification, a moving robot, a robot cleaner and a cleaner performing autonomous travel (driving) will be used as the same meaning.

Referring to FIGS. 1 to 3, the robot cleaner 100 performs a function of cleaning a floor while traveling (moving) within a predetermined area. Here, cleaning the floor includes sucking dust (including foreign materials) of the floor or mopping the floor. The robot cleaner 100 includes a cleaner main body 110, a suction unit 120, a sensing unit (or sensor) 130, and a dust container 140.

The cleaner main body 110 is provided with a controller (not illustrated) for controlling the robot cleaner 100, and a wheel unit 111 for allowing a travel of the robot cleaner 100. The robot cleaner 100 may be movable or rotatable in all directions by the wheel unit 111.

The wheel unit 111 includes main wheels 111a and a sub wheel 111b. The main wheels 111a are provided on both sides of the cleaner main body 110, such that the robot cleaner 100 is rotatable in one direction or another direction according to a control signal of the controller. Each of the main wheels 111a may be operable independent of each other. For example, each of the main wheels 111a may be driven by different motors.

The sub wheel 111b supports the cleaner main body 110 together with the main wheels 111a, and assists the travel of the robot cleaner 100 by the main wheels 111a. The sub wheel 111b may also be provided on a suction unit 120 to be explained later. As described above, the controller may control the wheel unit 111 such that the robot cleaner 100 autonomously travels on the floor.

Meanwhile, the cleaner main body 110 is provided with a battery (not illustrated) for supplying power to the robot cleaner 100. The battery may be rechargeable, and detachably disposed on a lower surface of the cleaner main body 110.

The suction unit 120 is disposed in a shape of protruding from one side of the cleaner main body 110, to suck air containing dust. The one side may be a side that the cleaner main body 110 moves in a forward direction F, namely, a front side of the cleaner main body 110.

The drawings illustrate that the suction unit 120 has a shape of protruding from one side of the cleaner main body 110 toward all of front and both of right and left sides. In detail, a front end portion of the suction unit 120 is located at a position forwardly spaced apart from the one side of the cleaner main body 110, and right and left end portions of the suction unit 120 are located at right and left positions spaced apart from the one side of the cleaner main body 110.

As the cleaner main body 110 is formed in a circular shape and both sides of a rear end portion of the suction unit 120 protrude from the right and left sides of the cleaner main body 110, empty spaces, namely, gaps may be formed between the cleaner main body 110 and the suction unit 120. The empty spaces are spaces between both right and left end portions of the cleaner main body 110 and both right and left end portions of the suction unit 120, and each has a recessed shape into the robot cleaner 100.

When an obstacle is trapped in the empty space, the robot cleaner 100 may not be moved due to getting stuck by the obstacle. In order to prevent this, cover members 129 may be arranged to cover at least part of each of the empty spaces. The cover member 129 may be provided on the cleaner main body 110 or the suction unit 120. This embodiment illustrates that the cover member 129 protrudes from each of both sides of the rear end portion of the suction unit 120, so as to cover an outer circumferential surface of the cleaner main body 110.

The cover member 129 are disposed to fill the corresponding empty space, namely, at least part of the empty space between the cleaner main body 110 and the suction unit 120. This may result in implementing a structure capable of preventing the obstacle from being caught in the empty space, or facilitating a separation of the robot cleaner from the obstacle even if the obstacle is caught in the empty space.

The cover members 129 protruding from the suction unit 120 may be supported on the outer circumferential surface of the cleaner main body 110. The cover members 129 may be supported on a rear surface of the suction unit 120 when the cover members 129 protrude from the cleaner main body 110. According to the structure, when the suction unit 120 has an impact due to colliding against an obstacle, a part of the impact may be transmitted to the cleaner main body 110 to be dispersed.

The suction unit 120 may be detachably coupled to the cleaner main body 110. When the suction unit 120 is detached from the cleaner main body 110, a mop module (not illustrated) may be detachably coupled to the cleaner main body 110 in place of the separated suction unit 120. Accordingly, a user may attach the suction unit 120 on the cleaner main body 110 when desiring to remove dust on the floor, while attaching the mop module on the cleaner main body 110 when desiring to mop the floor.

When the suction unit 120 is mounted on the cleaner main body 110, it may be guided by the cover members 129. That is, the cover members 129 are disposed to cover the outer circumferential surface of the cleaner main body 110, so as to decide a relative position of the suction unit 120 with respect to the cleaner main body 110.

The sensing unit 130 is disposed on the cleaner main body 110. As illustrated, the sensing unit 130 may be disposed on one side of the cleaner main body 110 where the suction unit 120 is located, that is, on a front portion of the cleaner main body 110.

The sensing unit 130 may be arranged to overlap the suction unit 120 in a vertical (up and down) direction of the cleaner main body 110. The sensing unit 130 is disposed above the suction unit 120 to detect an obstacle or feature in front of the suction unit 120 so that the suction unit 120 located on the forefront of the robot cleaner 100 cannot collide against the obstacle. The sensing unit 130 is further configured to perform another type of sensing function different than this sensing function. This will be described in detail later.

The cleaner main body 110 is provided with a dust container receiving portion. The dust container 140 in which dust in the air sucked is separated from the air and collected is detachably coupled to the dust container receiving portion. As illustrated, the dust container receiving portion may be formed on another side of the cleaner main body 110, that is, on a rear side of the cleaner main body 110.

A part of the dust container 140 is received in the dust container receiving portion and another part of the dust container 140 may protrude toward the rear of the cleaner main body 110 (i.e., in a reverse direction R opposite to the forward direction F).

The dust container 140 is provided with an inlet through which air containing dust is introduced and an outlet through which the air separated from the dust is discharged. When the dust container 140 is disposed in the dust container receiving portion, the inlet and the outlet are configured to communicate with a first opening and a second opening formed through an inner wall of the dust container receiving portion, respectively.

An intake flow path within the cleaner main body 110 corresponds to a flow path from an inlet port (not illustrated) communicating with a communicating portion to the first opening. An exhaust flow path corresponds to a flow path from the second opening to an exhaust port.

According to the connection relationship, air containing dust introduced through the suction unit 120 is introduced into the dust container 140 along the intake flow path within the cleaner main body 110. While the air containing the dust passes through a filter or a cyclone, the air and the dust are separated from each other. The dust is collected in the dust container 140, and the air is discharged out of the dust container 140 to be finally discharged to outside through the exhaust port 112 along the exhaust flow path within the cleaner main body 110.

Figure 4:
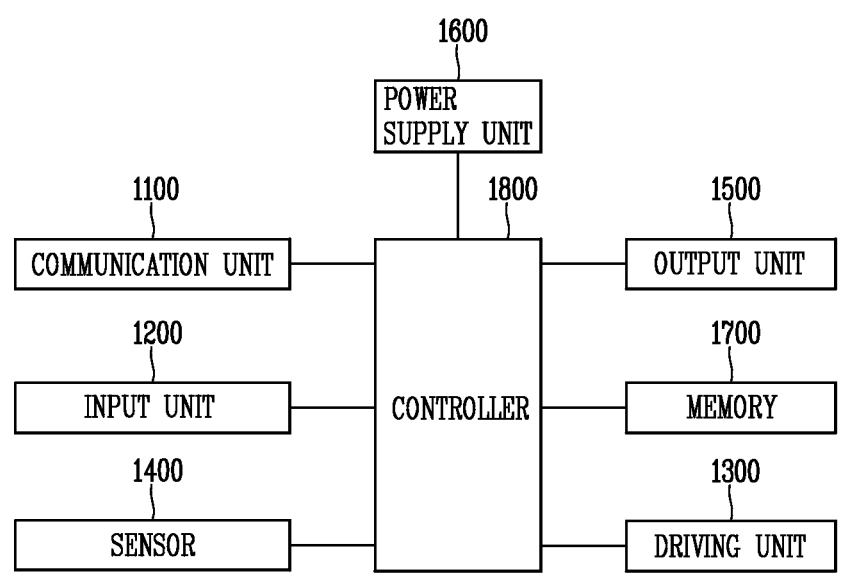
FIG. 4 is a block diagram illustrating components of a moving robot or a robot cleaner in accordance with one embodiment of the present disclosure.

Hereinafter, description will be given of one embodiment related to the components of the robot cleaner 100 with reference to FIG. 4. The robot cleaner 100 or the moving robot according to one embodiment of the present disclosure may include a communication unit (or transceiver) 1100, an input unit (or interface) 1200, a driving unit (or motor) 1300, a sensing unit (or sensor) 1400, an output unit (or display) 1500, and a power source unit 1600, a memory 1700 and a controller 1800, or a combination thereof. At this time, those components illustrated in FIG. 4 are not essential, so greater or fewer components may be provided to implement the robot cleaner. Hereinafter, each component will be described.

First, the power supply unit 1600 is provided with a battery rechargeable by an external commercial power source, and supplies power to the moving robot. The power supply unit 1600 may supply driving power to each of the components included in the moving robot, so as to supply operation power required for the moving robot to travel or perform a specific function.

At this time, the controller 1800 may detect a remaining power level of the battery and control the moving robot to move to a charging stand connected to the external commercial power source upon an occurrence of a shortage of the remaining power, such that the battery can be recharged by receiving currents from the charging stand. The battery may be connected to a battery detecting unit, and thus the remaining power level of the battery and a charging state may be transmitted to the controller 1800. The controller may control the output unit 1500 to display the remaining power level of the battery on a screen.

The battery may be located on a bottom of a center of the robot cleaner, or may be located on a right or left side. For the latter, the moving robot may further include a balance weight to eliminate a weight bias of the battery.

The driving unit 1300 may include a motor. By driving the motor, the right and left main wheels may be rotated in both directions to rotate or move the cleaner main body. The driving unit 1300 may allow the main body of the moving robot to perform a forward/backward/right/left travel, a curved travel, or a rotation in place.

Meanwhile, the input unit 1200 receives various control commands with respect to the robot cleaner from the user. The input unit 1200 may include at least one button, for example, an OK button, a setting button, and the like. The OK button is a button for receiving a user command for confirming detection information, obstacle information, position information, and map information. The setting button is a button for receiving a user command for setting those information.

In addition, the input unit 1200 may include an input reset button for canceling a previous user input and receiving a user input again, a delete button for deleting a preset user input, a button for setting or changing an operation mode, a button for receiving a command to return to the charging stand, and the like. Also, the input unit 1200 may be a hard or soft key, a touchpad, or the like, which is installed at an upper portion of the moving robot. In addition, the input unit 1200 may implement a form of a touch screen together with the output unit 1500.

On the other hand, the output unit 1500 may be installed on an upper portion of the moving robot. Of course, an installation location or an installation type may vary. For example, the output unit 1500 may display a battery level, a traveling mode, and the like on a screen.

The output unit 1500 may also output internal status information related to the moving robot detected by the sensing unit 1400, for example, a current state of each component included in the moving robot. Also, the output unit 1500 may display on a screen external status information detected by the sensing unit 1400, for example, obstacle information, position information, map information, and the like. The output unit 1500 may be implemented as any one of a light emitting diode (LED), a liquid crystal display (LCD), a plasma display panel, and an organic light emitting diode (OLED).

The output unit 1500 may further include an audio output module for audibly outputting an operation process or an operation result of the moving robot performed by the controller 1800. For example, the output unit 1500 may output a warning sound to outside in response to a warning signal generated by the controller 1800.

In this case, the audio output module may be a module for outputting sound, such as a beeper, a speaker, and the like, and the output unit 1500 may output sound through the audio output module by using audio data or message data having a predetermined pattern stored in the memory 1700.

Accordingly, the moving robot according to one embodiment of the present disclosure may output environment information related to a traveling area on a screen in a visible manner or in an audible manner through the output unit 1500. According to another embodiment, the moving robot may transmit map information or environment information to a terminal device through the communication unit 1100 so that the terminal device outputs a screen or sound, which is to be outputted through the output unit 1500.

On the other hand, the communication unit 1100 is connected to the terminal device and/or another device (also called a term "home appliance" herein) located in a specific area in one of a wired manner, a wireless manner and a satellite communication manner, so as to transmit and receive signals and data.

The communication unit 1100 may perform data transmission and reception with another device located in a specific area. In this case, the another device may be any device that can be connected to a network to transmit and receive data, for example, an air conditioner, a heating device, an air purifier, a lamp, a TV, a vehicle and the like.

Also, the another device may be a device for controlling a door, a window, a water valve, a gas valve, or the like. The another device may also be a sensor for detecting temperature, humidity, air pressure, gas, or the like.

On the other hand, the memory 1700 stores a control program for controlling or driving the robot cleaner and data corresponding thereto. The memory 1700 may store audio information, image information, obstacle information, location information, map information, and the like. Also, the memory 1700 may store information related to a travel pattern.

The memory 1700 mainly uses a nonvolatile memory. Here, the nonvolatile memory (NVM, NVRAM) is a storage device in which stored data is continuously maintained even without a power supply. Examples of the storage device may include a ROM, a flash memory, a magnetic computer memory device (e.g., hard disk, diskette drive, magnetic tape, etc.), an optical disk drive, a magnetic RAM, a PRAM, and the like.

Meanwhile, the sensing unit 1400 may include at least one of an external signal detection sensor, a front detection sensor, a cliff detection sensor, a lower camera sensor, and an upper camera sensor. The external signal detection sensor may detect an external signal of the moving robot. The external signal detection sensor may be, for example, an infrared ray sensor, an ultrasonic sensor, a Radio Frequency (RF) sensor, or the like.

The moving robot may confirm position and direction of the charging stand by receiving a guidance signal generated by the charging stand using the external signal detection sensor. At this time, the charging stand may transmit the guidance signal indicating direction and distance such that the moving robot returns. That is, the moving robot may determine its current location by receiving a signal transmitted from the charging stand, set a moving direction, and return to the charging stand.

On the other hand, the front detection sensor may be installed on a front side of the moving robot, in detail, installed on a side surface of the moving robot along an outer circumferential surface of the moving robot with a predetermined interval. The front detection sensor is located on at least one side surface of the moving robot and detects a front obstacle. The front detection sensor may detect an object, particularly, an obstacle, which is present in the traveling (advancing) direction of the moving robot and transmit detection information to the controller 1800. That is, the front detection sensor may detect a protrusion, a household fixture, furniture, a wall, a wall edge, and the like existing on a moving path of the moving robot and transmit detection information to the controller 1800.

For example, the frontal detection sensor may be an infrared sensor, an ultrasonic sensor, an RF sensor, a geomagnetic sensor, or the like, and the moving robot may use one type of sensor or two or more types of sensors, if needed, as the front detection sensor. The ultrasonic sensor, for example, may generally be used to detect a remote obstacle. The ultrasonic sensor may be provided with a transmitter and a receiver. The controller 1800 may determine presence or non-presence of an obstacle according to whether ultrasonic waves radiated from the transmitter are reflected by an obstacle or the like and received by the receiver, and calculate a distance from the obstacle using a ultrasonic wave radiation time and a ultrasonic wave reception time.

Also, the controller 1800 may detect information related to a size of an obstacle by comparing ultrasonic waves radiated from the transmitter with ultrasonic waves received by the receiver. For example, the controller 1800 may determine that the obstacle is larger when more ultrasonic waves are received in the receiver.

In one embodiment, a plurality (e.g., five) of ultrasonic sensors may be installed on side surfaces of the moving robot at the front side along the outer circumferential surface. At this time, preferably, the ultrasonic sensors may be installed on the front surfaces of the moving robot in a manner that the transmitter and the receiver are arranged alternately.

That is, the transmitters may be disposed at right and left sides with being spaced apart from a front center, or at least one or two transmitters may be disposed between the receivers to form a receiving area of an ultrasonic signal reflected from an obstacle or the like. With this arrangement, a number of sensors can be reduced and the receiving area can increase. A transmission angle of the ultrasonic waves may be maintained in a range of avoiding an affection to different signals so as to prevent a crosstalk. Also, reception sensitivity of the receivers may be set differently.

In addition, the ultrasonic sensor may be installed upward by a predetermined angle so that the ultrasonic waves emitted from the ultrasonic sensor re output upward. In this instance, the ultrasonic sensor may further include a predetermined blocking member to prevent the ultrasonic waves from being radiated downward.

On the other hand, as described above, the front detection sensor may be implemented by using two or more types of sensors together, and thus, the front detection sensor may use any one of an infrared sensor, an ultrasonic sensor, an RF sensor, and the like.

For example, the front detection sensor may include an infrared sensor as another type of sensor, in addition to the ultrasonic sensor. The infrared sensor may be installed on an outer surface of the moving robot together with the ultrasonic sensor. The infrared sensor may also detect an obstacle existing on a front or side of the moving robot and transmit obstacle information to the controller 1800. That is, the infrared sensor senses a protrusion, a household fixture, furniture, a wall, a wall corner, and the like, existing on the moving path of the moving robot, and transmits detection information to the controller 1800. Therefore, the moving robot can move within a specific area without collision with an obstacle.

On the other hand, a cliff detection sensor (or a cliff sensor) may detect an obstacle on the floor supporting the main body of the moving robot by mainly using various types of optical sensors. That is, the cliff detection sensor may also be installed on a rear surface of the moving robot on the floor, but may be installed on a different position depending on a type of the moving robot. The cliff detection sensor is located on the rear surface of the moving robot to detect an obstacle on the floor. The cliff detection sensor may be an infrared sensor, an ultrasonic sensor, an RF sensor, a position sensitive detector (PSD) sensor and the like, which are provided with a transmitter and a receiver similar to the obstacle detection sensor.

For example, one of the cliff detection sensors may be installed on the front of the moving robot, and two other cliff detection sensors may be installed relatively behind. For example, the cliff detection sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction and a two-dimensional PSD sensor that detects a light position on a plane, and both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle. That is, the PSD sensor calculates a distance from the obstacle by using the triangulation method.

The PSD sensor includes a light emitter that emits infrared rays to an obstacle and a light receiver that receives infrared rays that are reflected and returned from the obstacle. When an obstacle is detected by using the PSD sensor, a stable measurement value may be obtained irrespective of reflectivity and color difference of the obstacle.

The controller 1800 may measure an infrared ray angle between a light signal of infrared ray emitted by the cliff detection sensor toward the ground and a reflection signal reflected and received from the obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 determines presence or non-presence of a cliff and a depth of the cliff through the cliff detection sensor, and then allows the moving robot to pass through the cliff only when a reflection signal is detected through the cliff detection sensor. As another example, the controller 1800 may determine a lifting phenomenon of the moving robot using a cliff detection sensor.

On the other hand, the lower camera sensor is provided on a rear surface of the moving robot to acquire image information related to a lower side, i.e., a floor surface (or a surface to be cleaned) during the movement. The lower camera sensor is also referred to as an optical flow sensor in other words. The lower camera sensor converts am image of the lower side input from an image sensor provided in the lower camera sensor to generate image data of a predetermined format. The generated image data may be stored in the memory 1700.

Also, at least one light source may be installed adjacent to the image sensor. The at least one light source emits light to a predetermined area of the floor surface, which is captured by the image sensor. That is, while the moving robot moves in a specific area along the floor surface, a certain distance is maintained between the image sensor and the floor surface when the floor surface is flat. On the other hand, when the moving robot moves on a floor surface which is not flat, the image sensor and the floor surface are spaced apart from each other by a predetermined distance due to an unevenness and an obstacle on the floor surface. At this time, the at least one light source may be controlled by the controller 1800 to adjust an amount of light to be emitted. The light source may be a light emitting device, for example, a light emitting diode (LED), which is capable of adjusting an amount of light.

The controller 1800 may detect a position of the moving robot irrespective of slipping of the moving robot, using the lower camera sensor. The controller 1800 may compare and analyze image data captured by the lower camera sensor according to time to calculate a moving distance and a moving direction, and calculate a position of the moving robot on the basis of the moving distance and the moving direction. By using the image information regarding the lower side of the moving robot using the lower camera sensor, the controller 1800 may perform correction that is robust against slippage with respect to the position of the moving robot calculated by another member.

On the other hand, the upper camera sensor may be installed to face an upper or front side of the moving robot to capture surroundings of the moving robot. When the moving robot includes a plurality of upper camera sensors, the camera sensors may be disposed on the upper or side surface of the moving robot at a predetermined distance or at a predetermined angle.

Figure 5A:
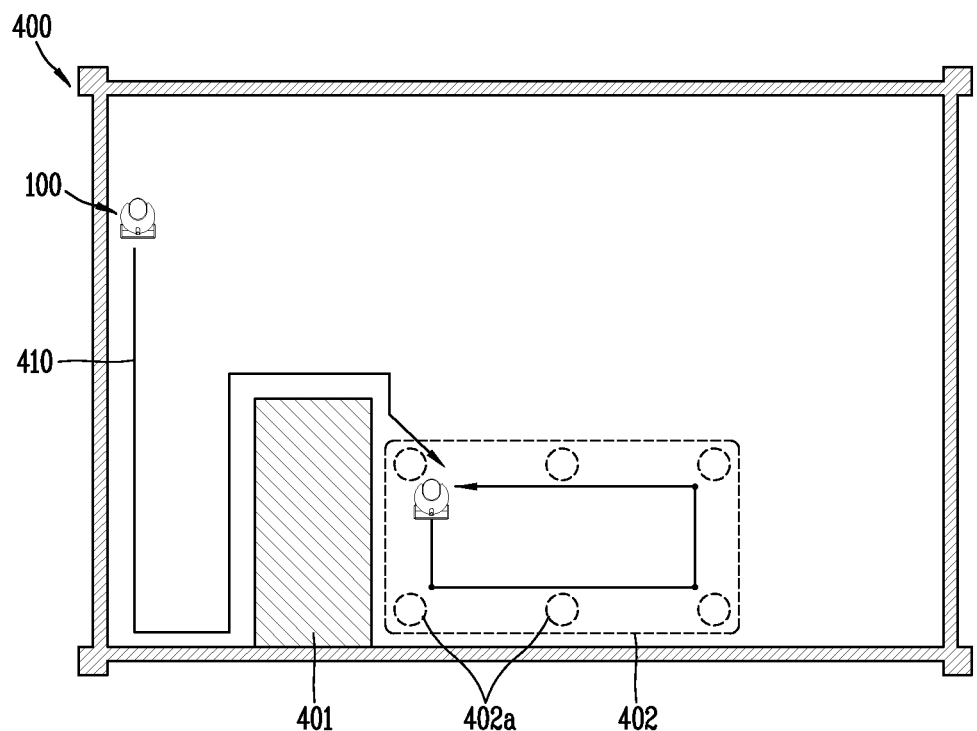
FIGS. 5A and 5B are conceptual views illustrating a method in which a robot cleaner moves within an operation region in accordance with one embodiment of the present disclosure.

Hereinafter, embodiments in which the robot cleaner 100 illustrated in FIGS. 1 to 3 moves within an operation region 400 will be described with reference to FIGS. 5A and 5B. Referring to FIG. 5A, the controller 1800 of the robot cleaner 100 may start an operation mode for returning to the charging stand.

In one example, the controller 1800 may execute an operation mode for returning to the charging stand when a remaining power level of the battery drops below a reference power level. In another example, when the communication unit 1100 receives a specific signal from an external terminal or an external server, the controller 1800 may execute the operation mode for returning to the charging stand. In another example, the controller 1800 may execute the operation mode for returning to the charging stand when the input unit 1200 receives a specific user input.

When the robot cleaner 100 enters the operation mode for returning to the charging stand, the controller 1800 may set a path for returning to the charging stand by using coordinate information related to the charging stand, current coordinates of the main body, and map information related to the operation region, and accordingly control the driving unit 1300 in a manner that the main body moves along the set path.

On the other hand, when the robot cleaner 100 does not recognize the coordinate information related to the charging stand or the current position information related to the main body, the controller 1800 may control the driving unit 1300 to perform wall following, in which the main body is allowed to travel along a wall surrounding the operation region, such that the main body of the robot cleaner 100 safely moves to the charging stand. In addition, the controller 1800 may control the sensing unit 1400 to collect information necessary for the wall following.

In general, since the charging stand is installed on a wall surface of the operation region, even if the map information related to the operation region or the coordinate information related to the charging stand is not recognized, the controller 1800 may perform the wall following to move the main body toward the charging stand. In addition, even if the map information and the coordinate information are stored in the memory 1700 of the robot cleaner 100, the controller 1800 may perform the wall following to move the main body to the charging stand, irrespective of errors of the map information, the coordinate information and the position information.

In detail, the controller 1800 may control the driving unit 1300 to move the main body of the robot cleaner 100 along the wall of the operation region 400 such that the main body moves to the charging stand, when a remaining power level of the battery drops below a reference power level.

In one embodiment, the controller 1800 may control the driving unit 1300 to move the main body along the wall in a state where the wall is located on the right side with respect to the moving direction of the main body. In this case, the main body may move counterclockwise along a periphery of the operation region. The direction of the wall following is not limited to the counterclockwise direction, and may be changed depending on a user's design. However, for the sake of explanation, it is defined hereinafter that the robot cleaner 100 performing the wall following mode moves along a wall surface or an obstacle surface in a state where the wall or the obstacle is positioned on the right side with respect to the advancing direction thereof.

As illustrated in FIG. 5A, the controller 1800 may control the driving unit 1300 to perform the wall following 410 along the wall surface of the operation region 400 or one surface of a first obstacle 401 existing within the operation region. Also, referring to FIG. 5A, the controller 1800 may enter a space formed under a second obstacle 402 of a trap type existing in the operation region 400 during the wall following 410.

In one example, the second obstacle 402 may be a desk or a bed having a plurality of legs 402a. In this manner, the robot cleaner 100 may perform the wall following even after entering the space formed under the second obstacle 402 having the plurality of legs 402a.

At this time, by an algorithm relating to the wall following of the robot cleaner 100, or a limit value of a resolution of a sensor collecting information for performing the wall following or a slippage generated between the floor surface and the driving wheel during the wall following, the robot cleaner 100 which has entered the space formed under the second obstacle 402 may fail to escape from the space and continuously perform the wall following circling within the space.

That is, referring to FIG. 5A, after the robot cleaner 100 enters an obstacle environment in which the robot cleaner 100 can enter or exit, a phenomenon may occur in which the robot cleaner circulates in the obstacle environment while performing the wall following. According to the phenomenon, the circulation of the robot cleaner 100 within the obstacle environment causes unnecessary power consumption, and serious reduction of possibility that the robot cleaner 100 can return to the charging stand. In addition, this phenomenon is contrary to the intention of the user who has requested the wall following, which causes inconvenience to the user.

Figure 5B:
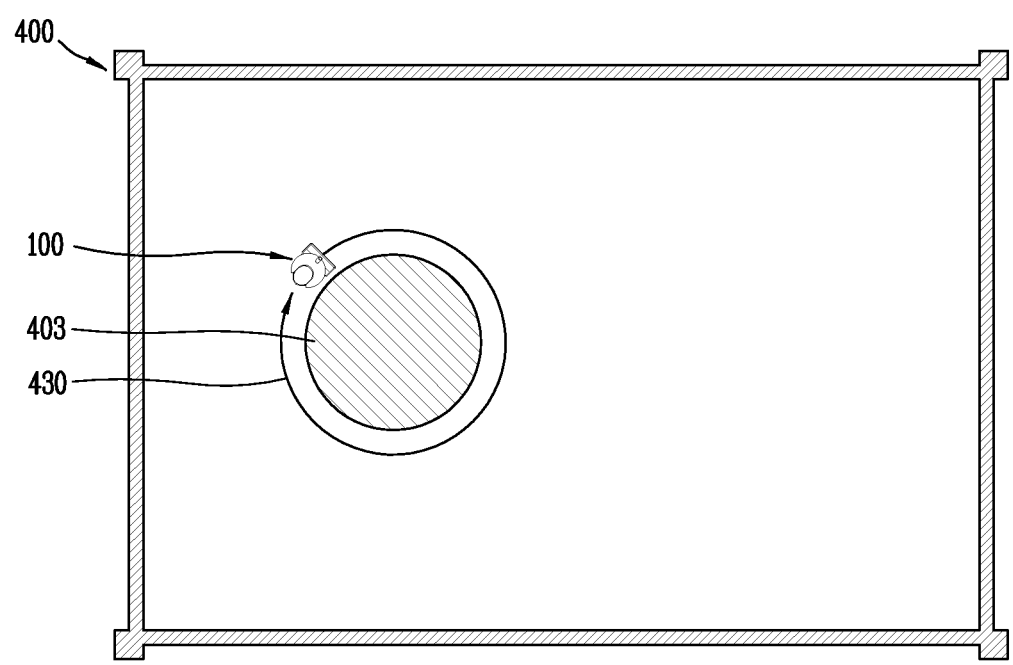

Referring to FIG. 5B, the robot cleaner 100 currently performing the wall following may circulate (430) along a periphery of a third obstacle 403 of an island-type.

In detail, the robot cleaner 100, which is performing the wall following, may move along an obstacle or a wall in a state where the obstacle or the wall is located on the right side of the main body. Accordingly, when the robot cleaner 100 starts performing the wall following along one surface of the island-type third obstacle 403, the robot cleaner 100 may circulate (430) along an outer surface of the third obstacle 403, failing to approach the wall of the operation region 400.

Referring to the embodiment illustrated in FIGS. 5A and 5B, when a part of a traveling path of the robot cleaner 100 forms a closed curve (or loop or looped path) before the robot cleaner 100 reaches the charging stand, the controller 1800 may determine that the robot cleaner 100 has entered an obstacle region which the robot cleaner 100 has difficulty escaping by only performing the wall following.

Hereinafter, description will be given of embodiments in which the robot cleaner 100 performs an escape travel from a trap-type obstacle region when the robot cleaner 100 enters the trap-type obstacle region during the wall following, with reference to FIGS. 6A and 6B.

Figure 6A:
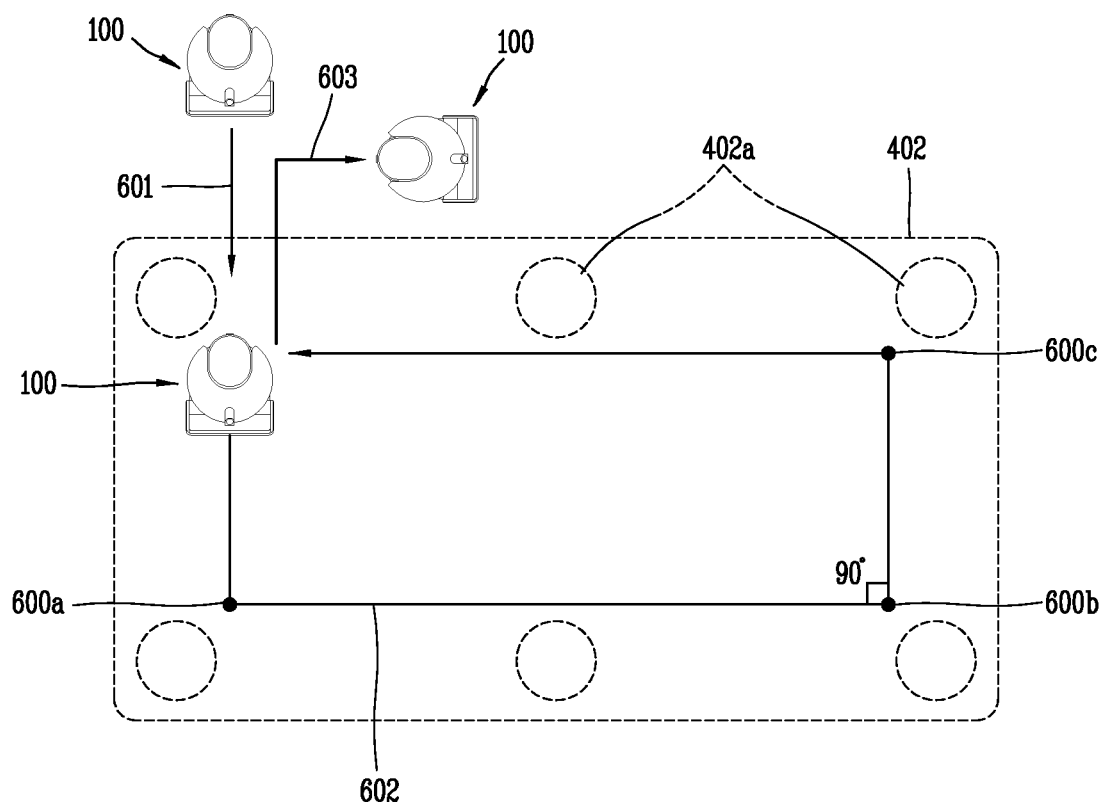
FIGS. 6A and 6B are conceptual views illustrating a method of performing an escape travel from a trap-type obstacle region when a robot cleaner enters the trap-type obstacle region while performing wall following, in accordance with one embodiment of the present disclosure.

Referring to FIG. 6A, when a movement path of the main body forms a closed curve 602 while the driving unit 1300 is performing the wall following such that the main body returns to the charging stand, the controller 1800 may control the driving unit 1300 in a manner that the main body escapes from one region corresponding to the closed curve. As illustrated in FIG. 6A, the robot cleaner 100 may enter an obstacle region where the trap-type second obstacle 402 exists while performing the wall following.

The controller 1800 may detect a rotation angle of the main body with respect to one direction every time the main body rotates, after the main body enters the obstacle region. The controller 1800 may detect the rotation angle of the main body using an encoder (not illustrated) provided in the driving wheel of the robot cleaner 100.

For example, the one direction may correspond to the advancing (or traveling, moving) direction of the main body. In detail, referring to FIG. 6A, the controller 1800 may detect the rotation angle of +90° at each of a plurality of points 600a, 600b and 600c, at which the advancing direction of the main body changes, while the robot cleaner 100 circulates with forming the closed curve within the obstacle region. On the other hand, the one direction for detecting the rotation angle may be changed according to a user setting.

In addition, the controller 1800 may calculate an accumulated rotation angle of the main body with respect to the traveling direction of the main body by using the rotation angles detected every time the main body rotates. For example, when the robot cleaner 100 makes a round of the obstacle region, the controller 1800 may calculate the accumulated rotation angle as +360°.

That is, according to the embodiment illustrated in FIG. 6A, when the robot cleaner 100 makes a round of the obstacle region, the controller 1800 may detect that the robot cleaner 100 has rotated by +90° at each of four points within the obstacle region and calculate the accumulated rotation angle as +360° using the respectively detected rotation angles.

When an absolute value of the accumulated rotation angle exceeds a preset reference angle value, the controller 1800 may determine that the movement path of the main body forms a closed curve, and control the driving unit 1300 to perform an escape travel such that the main body can escape from the obstacle region corresponding to the closed curve. In one example, a reference angle may be 360°, 720°, or 1080°. In addition, the reference angle may be changed by the user.

On the other hand, the controller 1800 may determine whether or not the main body has entered the obstacle region based on an area value corresponding to a movement range for a specific time interval. That is, after the start of the wall following, the controller 1800 may store information related to a movement history of the main body in the memory.

The controller 1800 may analyze the movement history for the specific time interval up to a current time point based on the information related to the movement history. When the analysis result shows that the area value corresponding to the movement range for the specific time interval is smaller than a reference area, the controller may determine that the main body has entered the obstacle region.

The controller 1800 may detect the rotation angle every time the main body rotates immediately after the start of the wall following or detect the rotation angle only after it is determined that the main body has entered the obstacle region using the analysis result of the movement history.

Referring to FIG. 6A, when it is determined that the movement path of the main body forms the closed curve, the controller 1800 may stop the wall following and control the driving unit 1300 to move the main body to the outside of the obstacle region.

In one embodiment, the controller 1800 may set an escape path for moving the main body of the robot cleaner 100 to the outside of the obstacle region, on the basis of the information related to the obstacle detected by the sensing unit 1400. In another embodiment, the controller 1800 may set an escape path for moving the main body of the robot cleaner 100 to the outside of the obstacle region, on the basis of the information related to the movement history stored in the memory 1700.

In detail, when an obstacle exists outside the closed curve formed by the movement path of the main body, the controller 1800 may stop the wall following of the driving unit 1300, and control the driving unit 1300 in a manner that the main body escapes from the obstacle region by moving back along the path of entering the obstacle region.

That is, as illustrated in FIG. 6A, when the robot cleaner 100 enters the space formed under the second obstacle 402, since the plurality of legs 402a provided on the second obstacle 402 exist at the outside of the closed curve formed by the wall following, the controller 1800 may stop the wall following and control the robot cleaner 100 to reversely move based on the information related to the movement history.

When the obstacle is present outside the closed curve formed by the movement path of the main body, the controller 1800 may stop the wall following of the driving unit 1300 and control the driving unit 1300 to move the main body to a point where the main body has entered the obstacle region. More specifically, the controller 1800 may control the driving unit 1300 to move the main body within the shortest distance from a current position to the point where the main body has entered the obstacle region, based on coordinate information related to a time point of entering the obstacle region.

Referring to FIG. 6A, the controller 1800 may set an escape path 603 of the robot cleaner 100 to be different from an approach path 601. Thus, the controller 1800 may prevent the robot cleaner 100 from entering the obstacle region again. In addition, when it is determined that the main body has escaped from the obstacle region, the controller 1800 may control the driving unit 1300 to perform the wall following again.

After detecting the obstacle region, the controller 1800 may store information related to the position of the obstacle region in the memory 1700. The controller 1800 may control the driving unit 1300 to avoid the obstacle region by using the stored position of the obstacle region when the wall following is restarted after the main body escapes from the obstacle region.

Figure 6B:
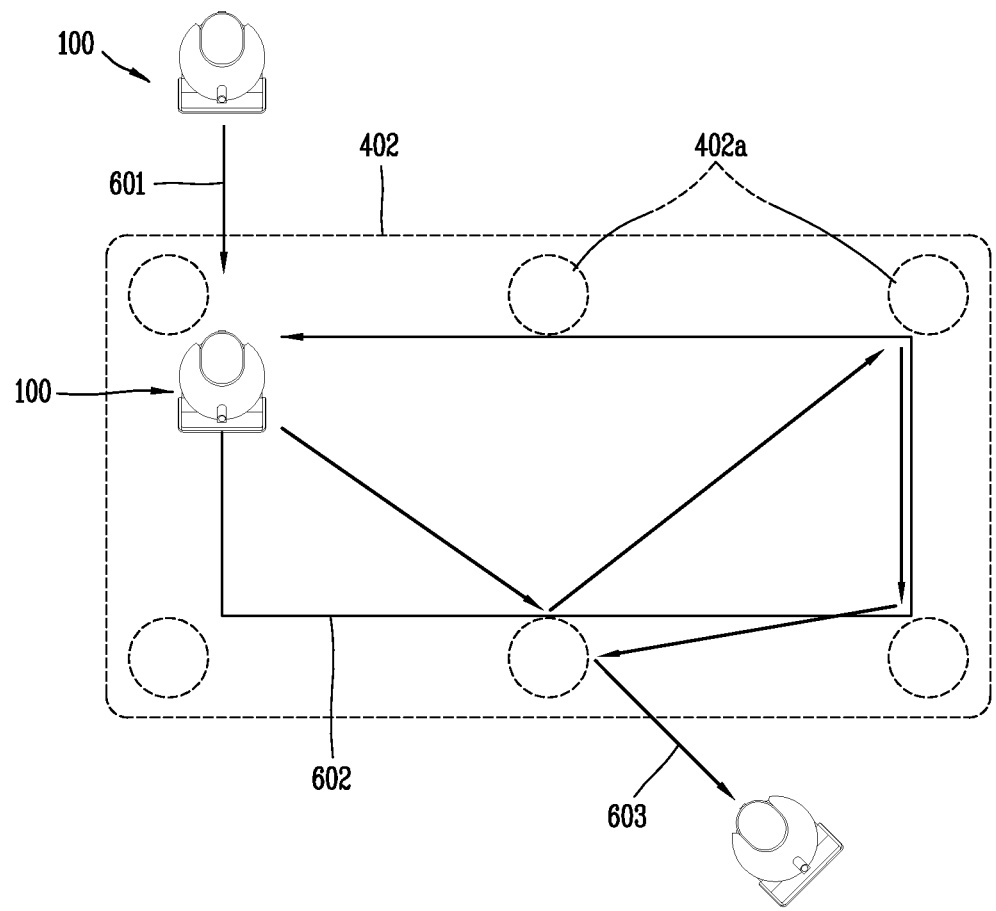

Referring to FIG. 6B, when the obstacle exists outside the closed curve formed by the movement path of the main body, the controller 1800 may control the driving unit 1300 to randomly change the traveling direction every time a collision occurs until the main body moves out of the obstacle region.

Hereinafter, description will be given of embodiments of performing an escape travel from an island-type obstacle region when the robot cleaner 100 enters the island-type obstacle region during wall following, with reference to FIG. 7.

Figure 7:
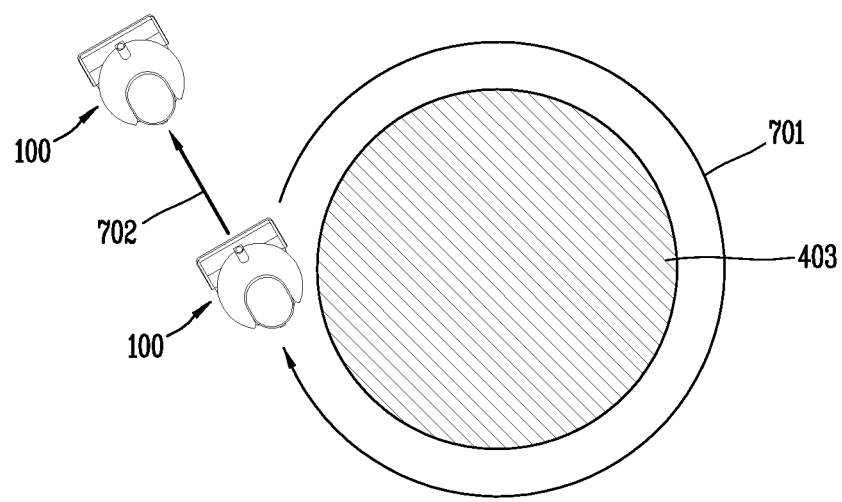
FIG. 7 is a conceptual view illustrating a method of performing an escape travel from an island-type obstacle region when a robot cleaner enters the island-type obstacle region while performing wall following, in accordance with one embodiment of the present disclosure.

Referring to FIG. 7, when the movement path of the main body forms the closed curve 602 while the driving unit 1300 performs the wall following such that the main body returns to the charging stand, the controller 1800 may control the driving unit 1300 in a manner that the main body escapes from an obstacle region corresponding to the closed curve.

As illustrated in FIG. 7, the robot cleaner 100 may start the wall following on an outer surface of an island-type third obstacle 403. In this case, the robot cleaner 100 may continuously move (701) along the outer surface of the third obstacle 403. The controller 1800 may detect a rotation angle of the main body for every predetermined period or may calculate an accumulated rotation angle of the main body for every predetermined period.

Comparing FIGS. 6A, 6B and 7, the controller 1800 may detect information related to an attribute of the obstacle region based on a direction in which the main body of the robot cleaner 100 rotates. Specifically, as illustrated in FIGS. 6A and 6B, the robot cleaner 100, which is performing the wall following in the space formed by the trap-type obstacle, may move in the counterclockwise direction to form the closed curve. On the other hand, referring to FIG. 7, the robot cleaner 100 which is performing the wall following along the outer surface of the island-type obstacle may move in a clockwise direction to form the closed curve.

Therefore, the controller 1800 may detect the type of the obstacle region, in which the robot cleaner 100 is present, as the trap type or the island type, based on the rotating direction of the main body. In addition, the controller 1800 may set an escape path for moving the main body out of the obstacle region based on the rotating direction of the main body.

That is, the controller 1800 may control the driving unit 1300 in a different way according to the type of the obstacle region in which the robot cleaner 100 is present, in order to allow the robot cleaner 100 to escape from the obstacle region. On the other hand, the controller 1800 may detect the type of the obstacle region by using information related to the obstacle detected by the sensing unit 1400.

That is, the controller 1800 may detect relative positions of the obstacle and the closed curve formed by the movement path of the main body, on the basis of information related to the detected obstacle, and detect the type of the obstacle region based on the detected relative positions.

In one embodiment, when an obstacle exists outside the closed curve formed by the movement path of the main body, the controller 1800 may determine that an obstacle region in which the main body exists is formed by the trap-type obstacle. In another embodiment, when an obstacle exists inside the closed curve formed by the movement path of the main body, the controller 1800 may determine that an obstacle region in which the main body exists is formed by the island-type obstacle. In another embodiment, when obstacles exist inside and outside the closed curve formed by the movement path of the main body, respectively, the controller 1800 may determine that an obstacle region in which the main body exists is formed by the island-type obstacle.

Although not illustrated in FIGS. 6A, 6B, and 7, when it is determined that the movement path of the main body forms the closed curve, the controller 1800 may control the output unit 1500 to output status information related to the moving robot.

When it is determined that the movement path of the main body forms the closed curve, the controller 1800 may determine that the main body has entered the obstacle region and control the output unit 1500 to output notification information related to entry or non-entry into the obstacle region. For example, the notification information may include at least one of time information and audio information. In addition, the controller 1800 may control the communication unit 1100 to transmit the notification information related to the entry or non-entry into the obstacle region to an external terminal. Also, the controller 1800 may control the output unit 1500 to output information related to the type of the obstacle region.

Figure 8:
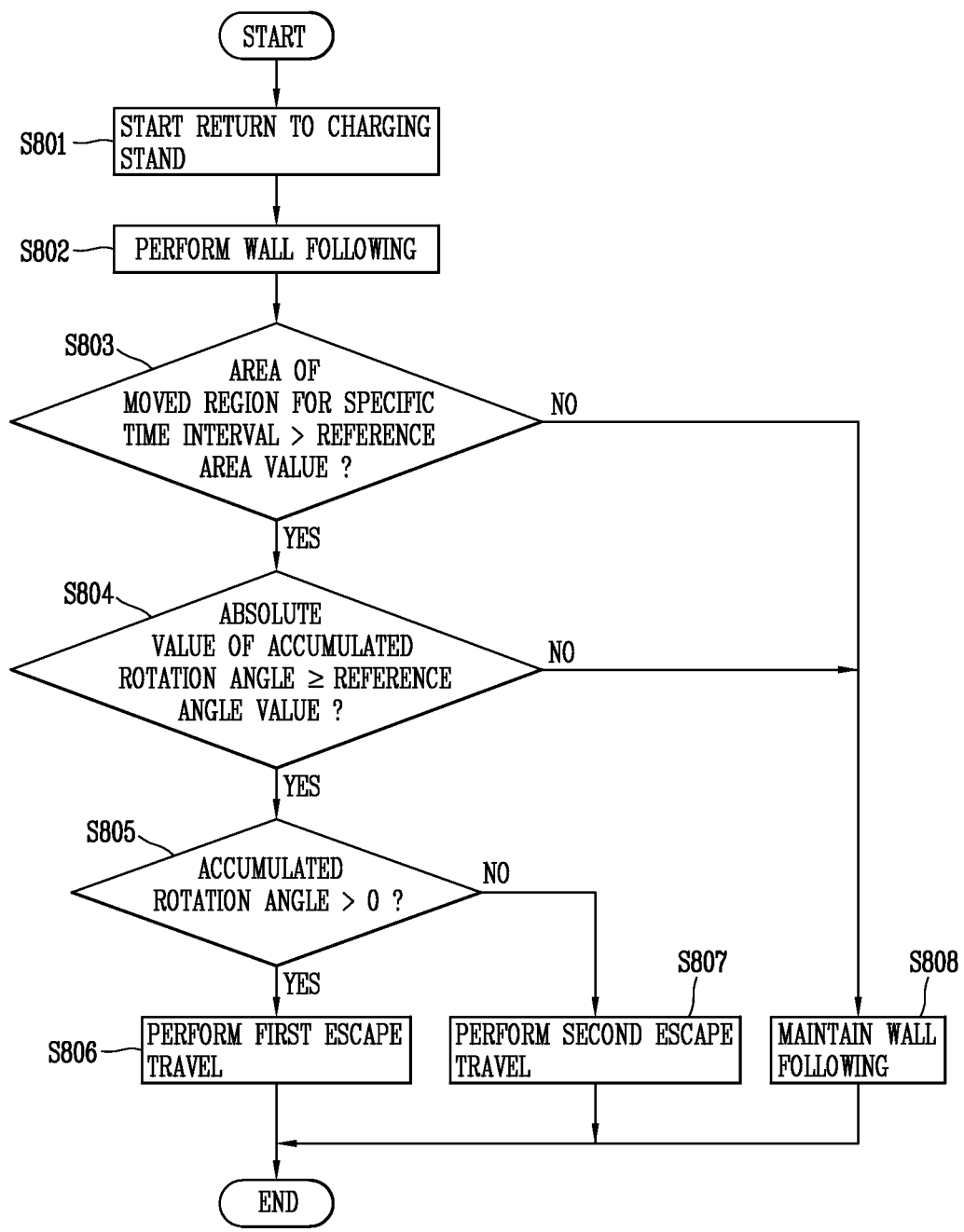
FIG. 8 is a flowchart illustrating a method in which a robot cleaner escapes from an obstacle region in accordance with one embodiment of the present disclosure.

Hereinafter, an embodiment related to a control method of the robot cleaner according to the present disclosure will be described, with reference to FIG. 8. When a remaining power level of the battery drops below a reference power level, the controller 1800 may start a charging stand return mode of the robot cleaner 100 (S801). When the charging stand return mode is started, the controller 1800 may control the driving unit 1300 to perform wall following in order for the main body of the robot cleaner 100 to travel along a wall of an operation region (S802).

The controller 1800 may determine whether an area of a region where the main body has moved for a specific time interval is smaller than a reference area value after the wall following is started (S803). The controller 1800 may detect the area of the region where the main body has moved for the specific time interval based on coordinate information related to the position of the main body, which is stored in real time, and determine that the main body has entered an obstacle region based on the detected area.

When the area of the region where the main body has moved for the specific time interval is less than the reference area value after the start of the wall following, the controller 1800 may maintain the wall following (S808). That is, when it is determined that the main body has not entered the obstacle region, the controller 1800 may control the driving unit 1300 to keep performing the wall following.

Further, the controller 1800 may detect a rotation angle of the main body with reference to one direction every time the main body rotates. The controller 1800 may detect the rotation angle of the main body with reference to the one direction for every predetermined period.

The controller 1800 may calculate an accumulated rotation angle of the main body with respect to the one direction by using the rotation angle detected every time the main body rotates or the rotation angle detected for every predetermined period. In addition, the controller 1800 may determine that the main body has entered the obstacle region based on the detected area and the accumulated rotation angle.

That is, the controller 1800 may determine whether an absolute value of the accumulated rotation angle exceeds a preset reference angle value (S804). When the absolute value of the accumulated rotation angle exceeds the preset reference angle value, the controller 1800 may determine that the main body has entered the obstacle region and control the driving unit 1300 such that the main body escapes from the obstacle region. For example, the reference angle may be set to be greater than 360°.

When the absolute value of the accumulated rotation angle is smaller than the preset reference angle value, the controller 1800 may determine that the main body has not entered the obstacle region and maintain the wall following (S808). That is, when it is determined that the main body has not entered the obstacle region based on the accumulated rotation angle, the controller 1800 may control the driving unit 1300 to keep performing the wall following.

In addition, the controller 1800 may determine a sign of the accumulated rotation angle (S805). The controller 1800 may detect an attribute of the obstacle region based on the sign of the accumulated rotation angle, and control the driving unit 1300 to perform a different escape travel according to the detected attribute of the obstacle region.

Specifically, when the sign of the accumulated rotation angle is a positive value, the controller 1800 may perform a first escape travel for the main body to escape from a trap-type obstacle region (S806). When the sign of the accumulated rotation angle is a negative value, the controller 1800 may perform a second escape route for the main body to escape from an island-type obstacle region (S807).

For example, when the obstacle exists in the closed curve formed by the movement path of the main body, the controller 1800 may stop the wall following and control the driving unit 1300 such that the main body is spaced apart from the obstacle region by a predetermined distance. In another example, when the obstacle exists outside the closed curve formed by the movement path of the main body, the controller 1800 may stop the wall following of the driving unit 1300 and control the driving unit 1300 to escape from the obstacle region in a manner that the main body moves backward along the path that the main body has entered the obstacle region. In another example, when the obstacle exists outside the closed curve formed by the movement path of the main body, the controller 1800 may stop the wall following of the driving unit 1300 and control the driving unit 1300 to move the main body to a point where the main body has entered the obstacle region.

Figure 9A:
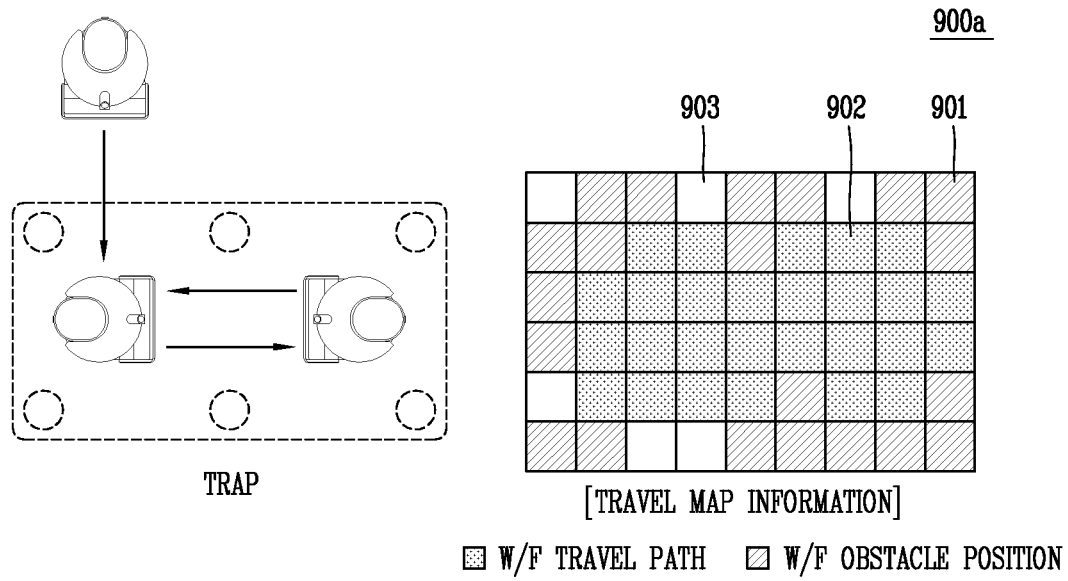
FIGS. 9A and 9B are conceptual views illustrating map information generated while a robot cleaner moves within an obstacle region in accordance with one embodiment of the present disclosure.
Figure 9B:
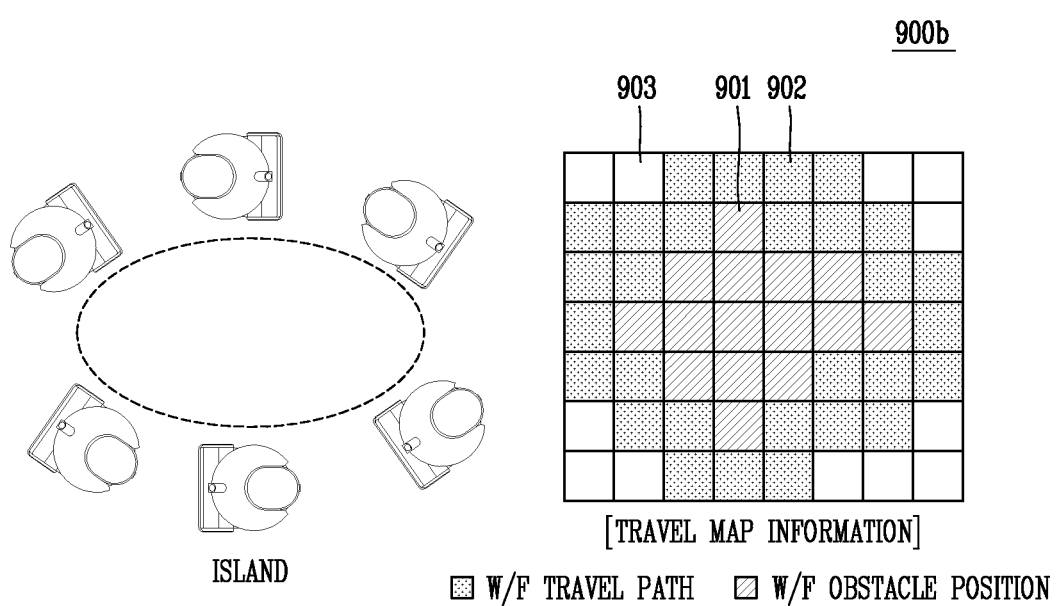

Referring to FIGS. 9A and 9B, the controller 1800 may generate map information 900a and 900b using information collected by the sensing unit 1400 while traveling in an obstacle region. The map information 900a and 900b may be provided with a plurality of cells, which include a cell 901 in which an obstacle exists, a cell 903 in which an obstacle does not exist, and a cell 902 corresponding to a traveling (movement) path.

The controller 1800 may detect an attribute of the obstacle region using the generated map information or set an escape path for escaping from the obstacle region. According to the present disclosure, even if the robot cleaner enters an obstacle environment having various conditions, the robot cleaner can escape from the obstacle environment by detecting a shape of the obstacle environment using information collected through wall following. According to the present disclosure, even if the robot cleaner is unable to detect information related to a current position within a cleaning area or to process map information related to the cleaning area, the robot cleaner can avoid an obstacle during wall following so as to safely return to a charging stand.

Further, according to the present disclosure, since the robot cleaner which performs wall following can return to a charging stand without being trapped, a traveling performance of the robot cleaner can be improved. In addition, according to the present disclosure, since unnecessary power consumption of the robot cleaner can be prevented, the robot cleaner can exhibit increased power efficiency.

Therefore, an aspect of the present disclosure is to provide a robot cleaner, capable of avoiding a trap even without a use of separate coordinate information, while performing wall following, and a method of controlling the same. Another aspect of the present disclosure is to provide a robot cleaner capable of escaping an obstacle environment while traveling back to a charging stand, and a method of controlling the same.

Another aspect of the present disclosure is to provide a robot cleaner capable of detecting a shape of an obstacle which gets close while performing wall following, and a method of controlling the same. Another aspect of the present disclosure is to provide a robot cleaner capable of preventing a trap phenomenon of infinitely circulating within a predetermined area due to wall following, and a method of controlling the same.

To achieve these and other aspects and in accordance with the specification, as embodied and broadly described herein, there is provided a moving robot, including a main body, a driving unit to move the main body within an operation region, a battery to supply power to the driving unit, and a controller to control the driving unit in a manner that the main body travels along a wall of the operation region to move to a charging stand when a remaining power level of the battery drops below a reference power level.

In detail, the controller may control the driving unit in a manner that the main body escapes from one region corresponding to a closed curve when a movement path of the main body forms the closed curve while the driving unit performs wall following.

That is, the controller may change a traveling mode of the moving robot from a wall following mode into a trap escaping mode when the closed curve is formed by the movement path.

In one embodiment disclosed herein, the controller may detect a rotation angle of the main body with reference to one direction every time the main body rotates after the main body enters the one region, calculate an accumulated rotation angle of the main body with respect to the one direction by using the rotation angle detected every time the main body rotates, and determine that the movement path of the main body has formed the closed curve when the accumulated rotation angle exceeds a preset reference angle value.

In one embodiment disclosed herein, when it is determined that the movement path of the main body has formed the closed curve, the controller may stop the wall following of the driving unit and control the driving unit in a manner that the main body moves out of the one region.

In one embodiment disclosed herein, the moving robot may further include a sensing unit to detect information related to an obstacle existing within the operation region, and a memory to store at least one of information related to the detected obstacle and information related to a movement history of the main body. The controller may set an escape path for moving the main body out of the one region, on the basis of the information related to the obstacle detected by the sensing unit.

In one embodiment disclosed herein, when the obstacle is present within the closed curve formed by the movement path of the main body, the controller may stop the wall following of the driving unit, and control the driving unit in a manner that the main body is spaced apart from the obstacle by a predetermined distance.

In one embodiment disclosed herein, when the obstacle is present outside the closed curve formed by the movement path of the main body, the controller may stop the wall following of the driving unit, and control the driving unit in a manner that the main body escapes from the one region by moving backward along a path that the main body has entered the one region.

In one embodiment disclosed herein, when the obstacle is present outside the closed curve formed by the movement path of the main body, the controller may stop the wall following of the driving unit, and control the driving unit to move the main body toward a point where the main body has entered the one region.

In one embodiment disclosed herein, the controller may detect a size of a region where the main body has moved for a specific time interval using the information related to the movement history of the main body stored in the memory, stop the wall following of the driving unit based on the detected size of the region, and control the driving unit to move the main body out of the one region.

In one embodiment disclosed herein, the controller may set an escape path for moving the main body out of the one region, on the basis of a rotating direction of the main body while the closed curve is formed by the movement path of the main body. In one embodiment disclosed herein, the controller may control the driving unit to perform the wall following again when it is determined that the main body has escaped from the one region. In one embodiment disclosed herein, the moving robot may further include an output unit to output status information related to the moving robot when it is determined that the movement path of the main body forms the closed curve.

The controller of another moving robot according to the present disclosure may control the driving unit in a manner that the main body escapes from an obstacle region when the main body enters the obstacle region while the driving unit performs wall following.

In one embodiment disclosed herein, the moving robot may further include a memory to store coordinate information related to the main body. The controller may detect an area of a region where the main body has moved for a specific time interval, on the basis of the coordinate information, and determine that the main body has enters the obstacle region based on the detected area.

In one embodiment disclosed herein, when it is determined that the main body has entered the obstacle region, the controller may detect a rotation angle of the main body with reference to one direction every time the main body rotates, calculate an accumulated rotation angle of the main body with respect to the one direction using the rotation angle detected every time the main body rotates, and determine that the main body has entered the obstacle region based on the detected area and the accumulated rotation angle.

In one embodiment disclosed herein, when an absolute value of the accumulated rotation angle exceeds a preset reference angle value, the controller may determine that the main body has entered the obstacle region and control the driving unit in a manner that the main body escapes from the obstacle region. In one embodiment disclosed herein, the controller may detect information related to an attribute of the obstacle region according to a sign of the accumulated rotation angle, and set an escape path for moving the main body out of the obstacle region on the basis of the detected attribute of the obstacle region.

In one embodiment disclosed herein, the moving robot may further include a sensing unit to detect information related to an obstacle existing within the operation region. When the absolute value of the accumulated rotation angle exceeds the preset reference angle value, the controller may detect the information related to the attribute of the obstacle region based on the information detected by the sensing unit, and set an escape path for moving the main body out of the obstacle region on the basis of the detected attribute of the obstacle region.

In one embodiment disclosed herein, when the obstacle is present within the closed curve formed by the movement path of the main body, the controller may stop the wall following of the driving unit and control the driving unit in a manner that the main body is spaced apart from the obstacle region by a predetermined distance. In one embodiment disclosed herein, when the obstacle is present outside the closed curve formed by the movement path of the main body, the controller may stop the wall following of the driving unit, and control the driving unit in a manner that the main body escapes from the obstacle region by moving backward along a path that the main body has entered the obstacle region.

In one embodiment disclosed herein, when the obstacle is present outside the closed curve formed by the movement path of the main body, the controller may stop the wall following of the driving unit and control the driving unit to move the main body to a point where the main body has entered the obstacle region.

According to the present disclosure, even if the robot cleaner enters an obstacle environment having various conditions, the robot cleaner can escape from the obstacle environment by detecting a shape of the obstacle environment using information collected through wall following. According to the present disclosure, even if the robot cleaner is unable to detect information related to a current position within a cleaning area or to process map information related to the cleaning area, the robot cleaner can avoid an obstacle during wall following so as to safely return to a charging stand.

Further, according to the present disclosure, since the robot cleaner which performs wall following can return to a charging stand without being trapped, a traveling performance of the robot cleaner can be improved. In addition, according to the present disclosure, since unnecessary power consumption of the robot cleaner can be prevented, the robot cleaner can exhibit increased power efficiency.

In another implementation, an autonomous robot comprises a main body coupled to at least one wheel; a motor to move the main body within a region by rotating the at least one wheel; a battery to supply power to the motor; and a controller to: control the motor such that the main body travels along a wall defining the region, and determine when a movement path of the main body forms a closed loop within a prescribed portion of the region, wherein the controller, when determining that the movement path of the main body has formed the closed loop within the prescribed portion of the region, further controls the motor such that the main body stops travelling along the wall and the main body moves out of the prescribed portion of the region.

In another implementation, an autonomous robot comprises: a main body coupled to at least one wheel; a motor to move the main body within a region by rotating the at least one wheel; a battery to supply power to the motor; and a controller to: control the motor to move the autonomous robot toward a charging stand when a remaining power level of the battery drops below a reference power level, and determine when a movement path of the main body forms a closed loop within a prescribed portion of the region while the motor moves the autonomous robot toward the charging stand, wherein the controller, when the movement path of the main body has formed the closed loop within the prescribed portion of the region, further controls the motor to move the main body out of the prescribed portion of the region.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autonomous robot, comprising:
a main body coupled to at least one wheel;
a motor configured to move the main body within a region by rotating the at least one wheel;
a battery configured to supply power to the motor; and
a controller configured to:
control the motor such that the main body travels along a wall defining the region, and
determine when a movement path of the main body forms a closed loop within a prescribed portion of the region,
wherein the controller, when determining that the movement path of the main body has formed the closed loop within the prescribed portion of the region, is further configured to control the motor such that the main body stops travelling along the wall and the main body moves out of the prescribed portion of the region.

2. The autonomous robot of claim 1, wherein the controller is further configured to:
determine a rotation angle of the main body with reference to a prescribed direction when the main body rotates after the main body enters the prescribed portion of the region,
calculate an accumulated rotation angle of the main body with respect to the prescribed direction based on the rotation angle with reference to the prescribed direction, and
determine that the movement path of the main body has formed the closed loop when the accumulated rotation angle exceeds a preset reference total angle value.

3. The autonomous robot of claim 1, wherein the controller is further configured to control the motor to move the main body along the wall to move the main body to a charging stand when a remaining power level of the battery drops below a reference power level.

4. The autonomous robot of claim 1, further comprising:
a sensor configured to detect information related to an obstacle existing within the region; and
a memory configured to store at least one of information related to the detected obstacle or information related to a movement history of the main body,
wherein the controller is further configured to set an escape path for moving the main body out of the prescribed portion of the region on the basis of the information related to the obstacle detected by the sensor.

5. The autonomous robot of claim 4, wherein the controller, when the obstacle is present within the closed loop formed by the movement path of the main body, is further configured to control the motor such that the main body is spaced apart from the obstacle by a predetermined distance.

6. The autonomous robot of claim 4, wherein the controller, when the obstacle is present outside the closed loop formed by the movement path of the main body, is further configured to control the motor such that the main body escapes from the prescribed portion of the region by moving back along a path by which that the main body has entered the prescribed portion of the region.

7. The autonomous robot of claim 4, wherein the controller, when the obstacle is present outside the closed loop formed by the movement path of the main body, is further configured to control controls the motor to move the main body toward a location where the main body has entered the prescribed portion of the region.

8. The autonomous robot of claim 1, wherein the controller is further configured to control the at least one wheel to perform an escape path such that the main body can escape from the prescribed portion of the region based on determining that the movement path of the main body has formed the closed loop.

9. The autonomous robot of claim 1, wherein the controller is further configured to control the motor to move the main body again along the wall after the main body has escaped from the prescribed portion of the region.

10. The autonomous robot of claim 1, further comprising a display configured to output status information related to the autonomous robot when the movement path of the main body forms the closed loop.

11. An autonomous robot, comprising:
a main body coupled to at least one wheel;
a motor configured to move the main body within a region by rotating the at least one wheel;
a battery configured to supply power to the motor; and
a controller configured to:
control the motor to move the autonomous robot toward a charging stand when a remaining power level of the battery drops below a reference power level, and
determine when a movement path of the main body forms a closed loop within a prescribed portion of the region while the motor moves the autonomous robot toward the charging stand,
wherein the controller, when the movement path of the main body has formed the closed loop within the prescribed portion of the region, is further configured to control the motor to move the main body out of the prescribed portion of the region.

12. The autonomous robot of claim 11, wherein the controller is further configured to:
determine a rotation angle of the main body with reference to a prescribed direction when the main body rotates after the main body enters the prescribed portion of the region,
calculate an accumulated rotation angle of the main body with respect to the prescribed direction by using the determined rotation angle with reference to the prescribed direction, and
determines determine that the movement path of the main body has formed the closed loop when the accumulated rotation angle exceeds a preset reference total angle value.

13. The autonomous robot of claim 11, wherein the controller, when controlling the motor to move the autonomous robot toward the charging stand, is further configured to cause the motor to move the main body along a wall defining the region, and wherein the controller, when controlling the motor to move the main body out of the prescribed portion of the region, is further configured to cause the motor to move the main body away from the wall.

14. The autonomous robot of claim 13, wherein the controller is further configured to control the motor to move the main body along the wall again when the main body has escaped from the prescribed portion of the region.

15. The autonomous robot of claim 11, further comprising:
a sensor configured to detect information related to an obstacle existing within the region; and
a memory configured to store at least one of information related to the detected obstacle or information related to a movement history of the main body,
wherein the controller is further configured to set an escape path for autonomous the main body out of the prescribed portion of the region on the basis of the information related to the obstacle detected by the sensor.

16. The autonomous robot of claim 15, wherein the controller, when the obstacle is present within the closed loop formed by the movement path of the main body, is further configured to control the motor such that the main body is spaced apart from the obstacle by a predetermined distance.

17. The autonomous robot of claim 15, wherein the controller, when the obstacle is present outside the closed loop formed by the movement path of the main body, is further configured to control the motor such that the main body escapes from the prescribed portion of the region by moving back along a path by which that the main body has entered the prescribed portion of the region.

18. The autonomous robot of claim 15, wherein the controller, when the obstacle is present outside the closed loop formed by the movement path of the main body, is further configured to control the motor to move the main body toward a location where the main body has entered the prescribed portion of the region.

19. The autonomous robot of claim 11, wherein the controller is further configured to control the one or more wheels to perform an escape path such that the main body can escape from the prescribed portion of the region when determining that the movement path of the main body has formed the closed loop.

20. The autonomous robot of claim 11, wherein the controller is further configured to:
generate mapping information related to the movement path of the main body within the prescribed portion of the region, and
determine when the movement path forms the closed loop within the prescribed portion of the region based on the mapping information.

* * * * *